July 13, 1948.  M. FISHER  2,445,303
APPARATUS FOR PROVIDING A RIDGE ON
A PIPE OF DUCTILE MATERIAL
Filed April 3, 1947
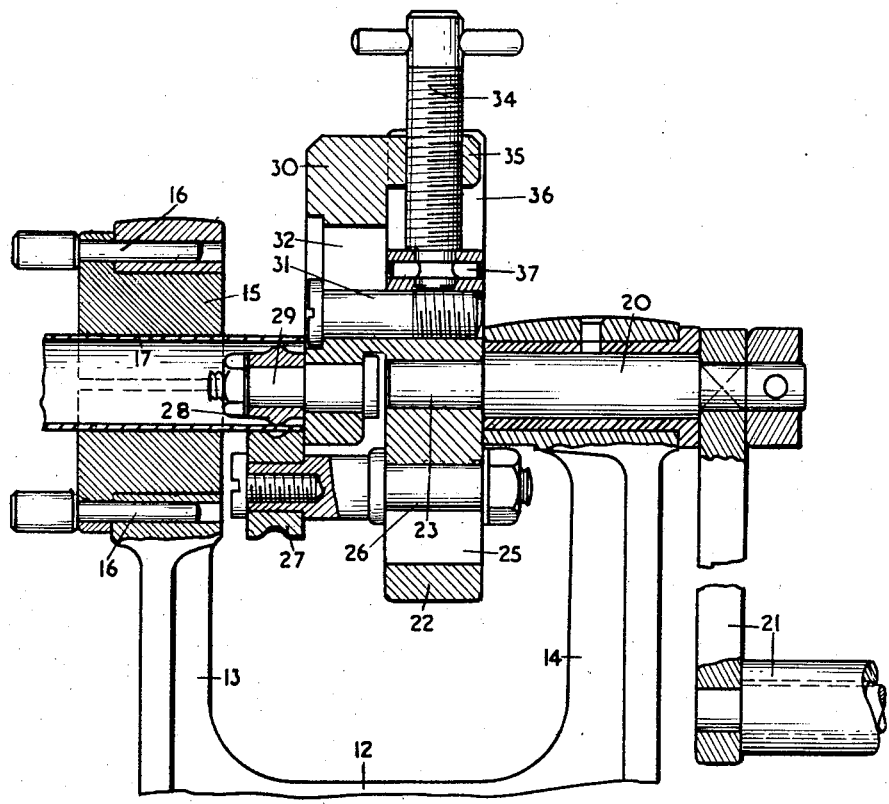
FIG 1.
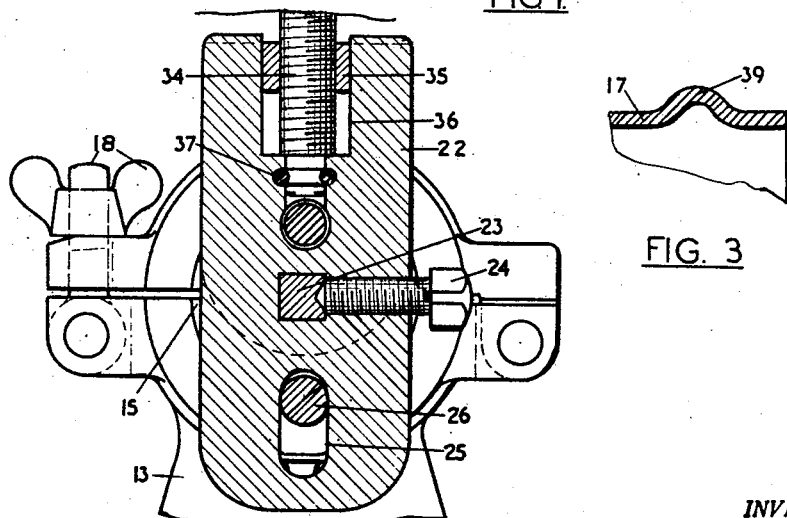
FIG. 2.
FIG. 3
INVENTOR.
Mark Fisher
BY
Mawhinney & Mawhinney
Attorneys Patented July 13, 1948

2,445,303

UNITED STATES PATENT OFFICE 2,445,303

APPARATUS FOR PROVIDING A RIDGE ON A PIPE OF DUCTILE MATERIAL

Mark Fisher, Coventry, England, assignor to Sir W. G. Armstrong Whitworth Aircraft Limited, Baginton, Coventry, England Application April 3, 1947, Serial No. 739,230
In Great Britain March 23, 1945

Section 1, Public Law 690, August 8, 1946
Patent expires March 23, 1965

7 Claims. (Cl. 153—9)

1

The main object of the present invention is to provide a beading or ridge on a tube or pipe of ductile material, for example, of aluminum or other light alloy, bronze or the like, near the end thereof, in a very simple and satisfactory manner, such a ridge often being required inter alia for use in joining the pipe to a connector.

The method of the invention involves using a member carrying two co-planar, rotatably-mounted rollers with appropriate complementary concave and convex peripheral surfaces respectively, placing the pipe to receive the convex roller axially in its bore, adjusting the concave roller laterally (unless it is already adjusted) so that its surface will contact the outside of the pipe, effecting relative rotation between the said member and the pipe about the axis of the latter, and moving the convex roller in a direction towards the concave roller until the ridge has been formed by a rolling action.

A preferred form of apparatus, according to the invention, includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof with the convex roller to be in the bore of the pipe and with the concave roller exteriorly thereof, means for setting the pin of the latter roller so that the roller will contact the pipe, and means for moving the pin of the convex roller in a direction towards the concave roller so that the ridge will be formed by a rolling action on the rotation of said member.

Conveniently the pin for the concave roller is adjustable along a radial slot in the said member, the pin for the convex roller being fast with a slide which is radially adjustable with respect to the member. Adjustment of the slide may be effected by means of a radially-extending manually-operable screw swivelled upon the member and having a threaded engagement with the slide.

In the accompanying drawings—

Figure 1 is a fragmentary sectional side elevation of apparatus according to the invention;

Figure 2 is a cross-section, through the rotatable member, taken from the right of Figure 1; and Figure 3 is an enlarged fragmentary section

2 of a pipe having a ridge formed near its end by the apparatus of Figures 1 and 2.

In the drawings there is a stationary base 12 (the lower portion of which has been omitted) providing two upright arms 13, 14. In the arm 13 there is detachably mounted a split bush 15 located, for example, by means of dowel pins 16, having a bore of a size to receive a tube 17 which is to be treated, and when the tube is in position, as shown by Figure 1, the bush is clamped by means of the clamping means 18 so as to hold it against rotation. The other vertical arm 14 has journalled in it a spindle 20 carrying at one end a driving handle 21 and at the other end the member above referred to as the rotatable member, which is marked in the drawings with the reference numeral 22.

The member 22 is located on the non-circular end 23 of the spindle by means of a set screw 24. It is provided with a radial slot 25 which adjustably accommodates a pin 26 for the concave roller 27 disposed externally of the tube so that it can contact the periphery thereof. The internal roller 28, having a convex surface, is mounted upon a pin 29 which is fast with a radially movable slide 30 carried by the member 22. 31 represents a pin carried by the member 22 and working in a slot 32 of the slide for assisting in guiding the latter.

For moving the slide radially we provide a screw 34 (with a left-hand thread) which is engaged with an extension 35 of the slide, the extension also being slidingly guided in a slot 36 of the member 22. The inner end of the screw has a swivel engagement at 37 with the said member 22. When the slide is right up (as shown) the centre line of the convex roller coincides with the centre line of the spindle 20.

The apparatus shown is one having a capacity to deal with tubes of an outside diameter of between ⅝" and 1½" and of 18-gauge thickness. To set up, the screw 34 is adjusted to place the convex roller 28 to be coaxial with the spindle 20. The pin 26 is slid radially-outwardly to be well clear of the tube, and a bush 15 of a size to receive the particular tube to be treated is then inserted in the opening of the vertical arm 13 and clamped in position when the tube has been inserted through it to reach the adjacent face of the slide and encircle the convex roller. The pin 26 is then adjusted to bring the concave roller into contact with the external surface of the tube. The screw 34 is then turned to bring the convex roller into contact with the bore of the tube.

To form the ridge or beading, the handle 21 is rotated, whilst at the same time, or intermittently, the screw 34 is turned to move the slide inwardly until a ridge (such as that indicated at 39 in Figure 3) has been completely formed, when the screw 34 can be turned no further in that direction.

It will be understood that in practice the screw 34 may be stiffened somewhat and it may, of course, be provided with a thumb nut or other means for effecting its rotation. The member 22 may be provided with guide plates to assist in guiding the slide 30. The frame may be made more robust and the bore for the bushes 15 may be increased. The pin 26 may be fitted with adjustment and more positive locking. Obviously, the handle 21 will be of an appropriate length.

What I claim as my invention and desire to secure by Letters Patent of the United States is:

1. A manually-operable apparatus for providing a ridge on a pipe of ductile material, near an end thereof, which includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof with the convex roller to be in the bore of the pipe and with the concave roller exteriorly thereof, means for setting the pin of the latter roller so that the roller will contact the pipe, and means for moving the pin of the convex roller in a direction towards the concave roller so that the ridge will be formed by a rolling action on the rotation of said member.

2. A manually-operable apparatus for providing a ridge on a pipe of ductile material, near an end thereof, which includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof with the convex roller to be in the bore of the pipe and with the concave roller exteriorly thereof, the pin of the concave roller being received in a radial slot of said member, clamping means on the concave roller pin for locking the latter in an adjusted position along said slot with its roller set to contact the exterior of the pipe, and means for moving the pin of the convex roller in a direction towards the concave roller so that the ridge will be formed by a rolling action on the rotation of said member.

3. A manually-operable apparatus for providing a ridge on a pipe of ductile material, near an end thereof, which includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof, with the convex roller to be in the bore of the pipe and with the concave roller exteriorly thereof, means for setting the pin of the latter roller so that the roller will contact the pipe, a slide with which the pin of the convex roller is fast, said slide being guided by a radial slot of said member, and screw-actuated means reacting between said member and said slide for moving the convex roller towards the concave roller so that the ridge will be formed by a rolling action on the rotation of said member.

4. A manually-operable apparatus for providing a ridge on a pipe of ductile material, near an end thereof, which includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof, with the convex roller to be in the bore of the pipe and with the concave roller exteriorly thereof, means for setting the pin of the latter roller so that the roller will contact the pipe, a slide with which the pin of the convex roller is fast, said slide being guided by a radial slot of said member, a manually-rotatable screw aligned with said slot and axially fast with said member, and a threaded engagement between said screw and said slide for moving the convex roller towards the concave roller so that the ridge will be formed by a rolling action on the rotation of said member.

5. A manually-operable apparatus for providing a ridge on a pipe of ductile material, near an end thereof, which includes a U-shaped frame having, in one arm thereof, a stationary clamping device for the pipe, a member supported by the other arm of the frame so as to be rotatable coaxially with respect to the pipe and provided with a crank handle, co-planar rollers which have, respectively, appropriate complementary concave and convex peripheral surfaces and which are rotatively mounted on pins extending from said member parallel to the rotational axis thereof, with the convex roller to be in the bore of the pipe and with the concave roller exteriorly thereof, means for setting the pin of the latter roller so that the roller will contact the pipe, a slide with which the pin of the convex roller is fast, said slide being guided by a radial slot of said member, a guide pin fast with said member and engaging in a guide slot of said slide, said guide slot being aligned with said radial slot of said member, and means for moving the pin of the convex roller in a direction towards the concave roller so that the ridge will be formed by a rolling action on the rotation of said member.

6. Manually-operable apparatus for forming a beading in the wall of a pipe, of ductile material, near an end thereof, comprising a U-shaped frame supporting coaxially, and respectively in its arms, a clamp for a pipe to be beaded and a rotatable member, a pair of co-planar rollers supported rotatively from said rotatable member, with their axes parallel to, but differently spaced on one side from, the rotational axis thereof, independent means for adjusting the positions of said rollers along a common line which is radial with respect to the said rotational axis and to one side thereof, a convex periphery on that one of said rollers which is nearer the said rotational axis, a complementarily concave periphery on the other said roller, and manual means for rotating said rotatable member to cause said rollers, when adjusted to grip between them the wall of a pipe mounted in said clamp, to form the beading.

7. Manually-operable apparatus for forming a beading in the wall of a pipe, of ductile material, near an end thereof, comprising a U-shaped frame, a clamp for the pipe and a bearing, arranged coaxially, respectively fast with the arms of said frame, a rotatable member fast with a spindle supported in said bearing, a guide-way in said member arranged radially of said spindle, a roller with a convex periphery rotatively supported by a slide which is adjustably slidable along said guide-way towards and from a position in which said roller is concentric with said spindle, a second guide-way in said member in alignment with the first said guide-way but on the diametrically-opposite side of the axis of said spindle, a second roller, co-planar with the first said roller and having a periphery of a contour which is complementary thereto, rotatively supported on a pin which is adjustably slidable along said second guide-way on that side of said spindle to which the first said roller can be slid, means for adjustably locating said pin in said second guide-way with the said second roller in contact with the exterior of a pipe held in said clamp, means for urging said slide along the first said guide-way so as to cause the first said roller to contact the interior of the pipe and urge it against said second roller, and manual means for rotating said spindle so as to cause the nip between both said rollers to travel circumferentially of the pipe for forming the beading.

MARK FISHER.

REFERENCES CITED

The following references are of record in the file of this patent:

UNITED STATES PATENTS

| Number | Name | Date |
|---|---|---|
| 1,512,394 | Bower | Oct. 21, 1924 |
| 2,085,710 | Tornblom et al. | June 29, 1937 |
| 2,377,406 | Dedrick | June 5, 1945 |